# 2,820,714

GYPSUM PLASTER SET STABILIZATION

Henry James Schneiter, Buffalo, N. Y., and Otto A. Oshida, Canon City, Colo., assignors to National Gypsum Company, Buffalo, N. Y., a corporation of Delaware No Drawing. Application October 10, 1955
Serial No. 539,651

8 Claims. (Cl. 106—110)

This invention relates to a compound for addition to calcined gypsum plaster for stabilizing the time of set of the plaster and to the method of preparing a gypsum plaster which is stabilized as to the time of set to a markedly improved degree.

Ground, raw gypsum, $CaSO_4 \cdot 2H_2O$, is commercially calcined to the hemihydrate or commercial plaster, $CaSO_4 \cdot \frac{1}{2}H_2O$, which upon the addition of water readily reconverts to the solid dihydrate, set plaster, $CaSO_4 \cdot 2H_2O$, a most common structural material. Toward the end of varying as desired the time of set of a given commercial plaster, various set accelerating and set retarding additives have been mixed with the calcined plaster. However, such attempts have been unsuccessful insofar as providing a stabilized time of set, that is, one which is unaffected by time of storage, types of sand or aggregates and water added, changes in temperature, and subjection to extraneous materials during job application.

Attempts have been made to control the effects of various of the above elements upon time of set, and have been generally referred to as set-stabilization. The common approach to the problem of stabilization has been through improvements in the material employed for set acceleration.

Set-stabilization of plaster is obtained generally by adding a small percentage of some form of uncalcined calcium sulfate accelerator to the calcined calcium sulfate or plaster. The effect of the uncalcined calcium sulfate on hydration of the mixture is termed seeding. Theoretically, the uncalcined crystals provide cores or "seeds" for instigating the growth of set plaster crystals, accelerating the initial formation of the set crystals, and thus accelerating the over-all setting of the plaster.

A vital objection to the use of uncalcined calcium sulfate, however, lies in the fact that if raw calcium sulfate or gypsum is added to the calcined product before the calcined product has cooled, the added gypsum becomes calcined by the heat given off from the previously calcined material, destroying an uncontrollable degree of the accelerating characteristic of the raw gypsum, defeating all stabilization. Delay in adding accelerator until the calcined product has cooled, to obtain stabilization, works a commercially undesirable hardship. To overcome this problem and to improve upon set stabilization, the prior art teaches adding in the dry, uncombined form, aluminum sulfate, commonly termed alum, and hydrated lime to the calcined calcium sulfate. The theoretical explanation of the reaction is given, stating that the alum and lime react, upon the on-the-job addition of water to the calcined plaster mixture, to produce a precipitated gypsum dihydrate, $CaSO_4 \cdot 2H_2O$, which acts as a seeding agent to accelerate the set of a gypsum plaster. Following are the proportions set forth for the above prior mixture:

| | Pounds |
|---|---|
| Calcined gypsum hemihydrate | 2000 |
| Dolomitic hydrated lime | 20–25 |
| Aluminum sulfate $Al_2(SO_4)_3 \cdot 18H_2O$ | 15–20 |
| Commercial retarder | 8–11 |
| Sand (added on the job) | 0–10,000 |

Based on the prior theory set forth regarding the above formula, that a calcium sulfate dihydrate is formed by the lime and alum, and the previous knowledge that calcium sulfate dihydrate cannot be added to uncooled calcined calcium sulfate and obtain the desired acceleration and stabilization, it would appear obvious that it would be undesirable to pre-react the lime and alum and add the dried precipitate to uncooled calcined calcium sulfate. At the very least it would appear that, if such synthetic calcium sulfate were premixed with uncooled calcined calcium sulfate, an excessive amount would be necessary to obtain the necessary acceleration and that the lack of control of the anticipated calcination of the synthetic calcium sulfate would substantially eliminate any degree of stabilization.

It has now been found, however, that a further improved set-stabilizer may be provided by the preparation in accordance with this invention of a dry synthetic precipitate of the hydration reaction of lime and alum or the equivalents thereof. It is therefore an object of the present invention to provide a stabilizer of increased accelerating strength, thus requiring lesser amounts for any desired acceleration, which stabilizer provides a marked improvement in set-stabilization of calcined calcium sulfate, and provides the above advantages when admixed with a major portion of uncooled calcined calcium sulfate.

Terminology

For simplification of the terminology hereinafter and in the claims appended hereto, it will be understood that the term gypsum will refer to raw calcium sulfate dihydrate, $CaSO_4 \cdot 2H_2O$, as obtained from the ground; that calcined gypsum refers to a commercially partially-dehydrated gypsum, calcium sulfate hemihydrate, $$CaSO_4 \cdot \tfrac{1}{2} H_2O$$

that a gypsum plaster refers to a mixture of calcined gypsum with such other additives as are desired and/or necessary; and that a set plaster refers to a dehydrated gypsum plaster, $CaSO_4 \cdot 2H_2O$, in the common set or hardened condition.

Novel stabilizer

The novel stabilizer consists broadly of the dry end product of the hydration of quicklime in the presence of aluminum sulfate, sodium acid sulfate or potassium aluminum sulfate, preferably aluminum sulfate, commonly known as alum. For best results, a filler, such as raw gypsum, calcined gypsum, limestone, diatomaceous earth, clay, silica flour, perlite fines, or dead burnt gypsum, is added prior to hydration. The pre-hydrated ingredients, by weight, are substantially as follows:

| | Percent |
|---|---|
| Dolomitic quicklime | 25–50 |
| Alum | 25–50 |
| Filler | 0–50 |

For hydration of the quicklime in the presence of the alum and filler, only enough water is added for complete hydration to a dry end product, keeping in mind the unavoidable steam loss during reaction. This controlled usage of water avoids further drying following hydration. The resultant product need only be ground to pass substantially 100% through a 100 mesh screen.

A stabilizer having between 0 and 50% filler is contemplated in accordance with the invention. Thus, basically, the invention resides in the pre-action of lime and alum prior to its addition, dry, to a calcined plaster. However, the addition of the specified fillers, especially the raw gypsum, prior to pre-hydration of the lime and alum provides surprising results, such that the "filler" appears to definitely add to the stabilization characteristics of the end product. For example, two stabilizers, in accordance with the invention, were prepared. The first stabilizer was the pre-reacted product of the hydration of 1 part alum to 1 part dolomitic quicklime; the second stabilizer was the pre-reacted product of the hydration of 1 part alum, 1 part dolomitic quicklime and 1 part raw gypsum. Three pounds of each modification of the novel stabilizer was added, with 4 pounds of retarder, to 2000 pounds of calcined gypsum and tested for setting characteristics, which were found to be:

|  | Laboratory set with clean mixing vessels, etc., hours | Job set, normally dirty box and tools, etc., hours |
|---|---|---|
| Gypsum plaster (with 1 alum, 1 lime, 1 raw gypsum, pre-reacted) | 6½ | 4½ |
| Gypsum plaster (with 1 alum, 1 lime, pre-reacted) | 5½ | 3 |

It will be seen, hereabove, that an actual improvement appears to be provided by replacing a portion of the lime and alum with the raw gypsum filler. It is this stabilizer, including filler, that is clearly the preferred form of the invention and is used herethroughout as the example in setting forth and describing the present invention.

No attempt has been made to exactly ascertain and define the chemical formula of the end product of the novel hydration reaction. The newly found results, however, disclosed hereinafter, tend to discredit the prior theory that a $CaSO_4 \cdot 2H_2O$ is formed, since the new pre-reacted stabilizer, instead of being destroyed on addition to uncooled calcined gypsum, provides, unexpectedly, an even further improved gypsum set-stabilizer over the stabilizers known heretofore.

Novel gypsum plaster

The novel stabilizer is formulated into a gypsum plaster, having improved set stabilization, substantially as follows:

|  | Pounds |
|---|---|
| Calcined gypsum | 2000 |
| Pre-hydrated stabilizer (1 lime:1 alum:1 filler) | 3 |
| Commercial retarder | 4 |

Prior to use, this gypsum plaster will have admixed therewith:

Sand _____ 0–10,000 lbs.

Commercial retarder is ordinarily manufactured by a basic hydrolysis and solubilization of various keratinaceous matter. Retarding strength of various retarders varies very substantially and thus the above proportion of retarder will be subject to wide variation as a result thereof. Other additives may also be incorporated in accordance with standard manufacturing procedure, based on the final product desired, and thus proportions of stabilizer will be considered as based on the amount of calcined gypsum. Thus, based on the weight of calcined gypsum, the novel stabilizer will be added in a proportion of approximately .1% to 1%, and preferably .15%.

Increased proportions of stabilizers, with a proportional increase in retarder, ordinarily provide improved stabilization. Above a certain relatively low ratio, the degree of improvement in stabilization continually decreases with each additional increment of stabilizer and retarder, reaching finally a point where substantially no improvement is realized by any further increase in stabilizer and retarder. This relation is true with the novel stabilizer as well as the prior stabilizers. Thus, the range of desired proportions of stabilizer is based, generally, on a practical and economical analysis, rather than wholly on an attempt to gain the ultimate in stabilization. For this reason, comparative data will be directed to a practical, but still far improved, formulation of the novel stabilizer and gypsum plaster.

Following is the preferred formulation of the novel gypsum plaster, sanded, and the respective setting characteristics thereof:

|  | Pounds |
|---|---|
| Calcined gypsum | 2000 |
| Pre-hydrated stabilizer (1 lime:1 alum:1 filler) | 3 |
| Commercial retarder | 4 |
| Sand | 0–8,000 |

| Parts of plaster and sand, by weight | Laboratory set, with clean mixing vessels, etc., hours | Job set, normally dirty box and tools, etc., hours |
|---|---|---|
| 1 plaster—no sand | 6½ | 4½ |
| 1 plaster—1 sand | 7 | 4½ |
| 1 plaster—2½ sand | 5½ | 4½ |
| 1 plaster—4 sand | 4½ | 3½ |

With the novel stabilized gypsum plaster, under normal conditions, an average variation of ⅜ hour from the average setting time, with variation in the parts of sand, is obtained with only .15% of stabilizer. An average variation of ⅞ hour from the average set was obtained under the less realistic clean conditions.

Prior gypsum plaster

In comparison to the above data, the following prior art formulation and setting characteristics are set forth, wherein a total of 2.25% of lime and alum are added separately.

|  | Pounds |
|---|---|
| Calcined gypsum | 2000 |
| Hydrated dolomitic lime | 25 |
| Alum | 20 |
| Commercial retarder | 11 |
| Sand | 0–8,000 |

| Parts of plaster and sand, by weight | Laboratory set, with clean mixing vessels, etc., hours | Job set, normally dirty box and tools, etc., hours |
|---|---|---|
| 1 plaster—no sand | 6½ | 4¼ |
| 1 plaster—1 sand | 6 | 3 |
| 1 plaster—2½ sand | 5½ | 3 |
| 1 plaster—4 sand | 5 | 3 |

The above prior formulation, with excessive stabilizing, accelerating, and retarding additives from a practical and economic standpoint, is set forth to show comparatively the extent of the unexpected improvement provided by the novel gypsum plaster is regard to stabilization against the influences of normal job conditions and variation in aggregate addition.

To clarify further the improvement provided by the novel stabilization, the following formulation and setting characteristics are set forth for a gypsum plaster made according to above prior art formula, but reduced to a more economical and practical ratio of .65% stabilizer added as separate ingredients:

|  | Pounds |
|---|---|
| Calcined gypsum | 2000 |
| Hydrated dolomitic lime | 8 |
| Alum | 5 |
| Commercial retarder | 4.5 |
| Sand | 0–8,000 |

| Parts of plaster and sand, by weight | Laboratory set, with clean mixing vessels, etc., hrs. | Job set, normally dirty box and tools, etc., hrs. |
|---|---|---|
| 1 plaster—no sand | 10½ | 7 |
| 1 plaster—1 sand | 8 | 5 |
| 1 plaster—2½ sand | 5½ | 5 |
| 1 plaster—4 sand | 5½ | 4 |

From the above, it will be seen that with a still substantially greater proportion of prior stabilizer relative to the proportions used in the novel gypsum plaster, the stabilization is seen to be considerably poorer in comparison to the stabilization of the novel gypsum plaster.

*Unstabilized gypsum plaster*

For complete clarification, the following formulation and setting characteristics are set forth for an unstabilized gypsum plaster:

|  | Pounds |
|---|---|
| Calcined gypsum | 2000 |
| Commercial retarder | 7 |
| Sand | 0–8,000 |

| Parts of plaster and sand, by weight | Laboratory set, with clean mixing vessels, etc., hrs. | Job set, normally dirty box and tools, etc., hrs. |
|---|---|---|
| 1 plaster—no sand | 49½ | 12¾ |
| 1 plaster—1 sand | 19 | 7¼ |
| 1 plaster—2½ sand | 7¼ | 4¼ |
| 1 plaster—4 sand | 6 | 3¼ |

*Analysis—Accelerating influence stabilization*

From the above data the following average setting times may be computed:

|  | Novel gypsum plaster .15% stabilizer, hrs. | Prior art plaster 2.25% stabilizer, hrs. | Prior art plaster .65% stabilizer, hrs. | Unstabilized plaster, hrs. |
|---|---|---|---|---|
| Average lab set | 5⅞ | 5¾ | 7¾ | 20⁷⁄₁₆ |
| Average job set | 4¼ | 3⁹⁄₁₆ | 5¼ | 6⅞ |

From the above average setting times, the following pertinent observations may be made:

|  | Novel gypsum plaster .15% stabilizer, hrs. | Prior art plaster 2.25% stabilizer, hrs. | Prior art plaster .65% stabilizer, hrs. | Unstabilized plaster, hrs. |
|---|---|---|---|---|
| Average variation in lab set | ⅞ | ½ | 1⅞ | 14¹⁷⁄₃₂ |
| Average variation in job set | ⅜ | 1⁵⁄₃₂ | ⅞ | 3⅛ |
| Diff.: Avg. lab set minus avg. job set | 1⅝ | 2⁷⁄₁₆ | 2½ | 13⁹⁄₁₆ |

Concluding the above analysis of the improved stabilization of the novel gypsum plaster against the accelerating influences of extraneous matter, the novel stabilization excels in all respects with the exception of the comparison of the average variation in laboratory set of .15% novel stabilizer with that of the 2.25% stabilizer prior plaster. The very marked improvement over the .65% stabilizer prior plaster laboratory set completely overshadows this exception and clearly establishes the superiority of the novel stabilized gypsum plaster. Furthermore, the improved stabilization in job setting time, even over the 2.25% stabilizer, best indicates the great degree of improvement provided by the novel stabilization.

*Temperature change stabilization*

A very substantial percentage of gypsum plaster is packaged and shipped, uncooled, directly to job sites for use immediately, or after any degree of delay up to the the time required for cooling. Shipments may have packages with mixed degrees of cooling. Therefore, a gypsum plaster stabilized, as to setting time, not only against varying tendencies caused by admixture with materials of accelerating influence, but also against the tendencies of variation in temperature or degree of cooling to vary the setting time, is highly desirable.

To show the comparative stabilization with respect to temperature of the novel stabilizer, setting times were obtained using gypsum plaster mixtures containing factory-added aggregate, rather than job-added sand. A gypsum plaster-perlite aggregate mixture, containing two cubic feet of expanded perlite aggregate per cubic foot of calcined gypsum, is highly suitable for analysis of temperature change stabilization, and the following data sets forth the results of such as analysis:

| Type of plaster | Temperature at time of use, °F. | Laboratory set, with clean mixing vessels, etc., hrs. | Job set, normally dirty mixing box and tools, etc., hrs. |
|---|---|---|---|
| Novel gypsum plaster, .15% pre-reacted stabilizer | 110 | 4 | 4 |
|  | 74 | 4 | 4 |
| Prior gypsum plaster, .65% stabilizer, of non-reacted ingredients | 110 | 9½ | 5½ |
|  | 74 | 8½ | 5 |

The actual variations in bag temperatures, from packing temperature to cooled temperature, is much greater than the conditions under which the above tests were made. Since attempts at laboratory comparative tests, using higher temperatures, cannot be made without creating other possibly misleading variables, the above conditions are relied upon for obtaining data which is indicative of comparative temperature stabilization.

The above data clearly shows the very marked improvement in stabilization, both respecting temperature and respecting the accelerating influences of normal dirty box and tools, with the use of the novel stabilizer in a perlite aggregate mixture.

*Advantages*

Numerous advantages are obtained by improvements in set stabilization of a gypsum plaster. The strength of a set plaster is well known to be markedly lessened by a slow set, and a decrease in the frequency of the necessity of operating under slow setting conditions is provided by improved stabilization. The disadvantages of applying a second plaster coat over an incompletely set prior coat is known, and improved stabilization reduces substantially the possibility of such occurrences. Improved quality of application is unquestionably provided when an applicator is able to rely more closely on time to determine the working condition of the applied plaster coating.

A further advantage, which has been recognized with the use of the novel gypsum plaster, is that, with the reduced percentage of lime, the setting characteristics and the strength of the resultant plaster structure is improved and more consistent from the outer surface through to the under surface.

*Equivalents*

While dolomitic quicklime, alum and ground raw gypsum have been found to be the preferred ingredients for the formation of the novel stabilizer, other equivalent material could be substituted within the concepts of the invention. High calcium quicklime, though less desirable economically, can replace the dolomitic quicklime. Hydrated lime can be pre-reacted with alum slowly in accordance with the invention but will require a further step of drying.

Sodium-bisulfate and potassium aluminum sulfate can be substituted for alum in accordance with the invention when dolomitic quicklime is used and a fair equivalent for the novel stabilizer is provided.

Several fillers have been found to provide a reasonable equivalent of the novel stabilizer when substituted in part or completely for ground raw gypsum. Such equivalents include calcined gypsum, limestone, diatomaceous earth, clay, silica flour, perlite and dead burnt gypsum.

Having completed a detailed disclosure of preferred

We claim:

1. The method of stabilizing the set of gypsum plaster comprising reacting in water a mixture consisting essentially of 2 parts of a sulfate of the group consisting of aluminum, sodium acid, and potassium aluminum in 1 to 4 parts lime and adding from .1 to 1 part of the dry product of said reaction and a minor portion of retarder to 100 parts of calcined gypsum.

2. A method of stabilizing the set gypsum plaster comprising reacting in water a mixture consisting essentially of from 25% to 50% of sulfate of the group consisting of aluminum, sodium acid and potassium aluminum, from 25% to 50% lime and a filler of the class consisting of raw gypsum, calcined gypsum, limestone, diatomaceous earth, clay, silica flour, perlite and dead burnt gypsum, and adding from .1 to 1 part of the product of said reaction in substanially dry form and a minor portion of retarder to 100 parts of calcined gypsum.

3. A method of stabilizing the set of gypsum plaster comprising reacting in water a mixture consisting essentially of from 25% to 50% alum, from 25% to 50% dolomitic quicklime and a filler of the class consisting of raw gypsum, calcined gypsum, limestone, diatomaceous earth, clay, silica flour, perlite and dead burnt gypsum, and adding from .1 to 1 part of the product of said reaction in substantially dry form and a minor portion of retarder to 100 parts of calcined gypsum.

4. A method of stabilizing the set of gpsum plaster comprising reacting in water a mixture consisting essentially of about 1 part alum, 1 part dolomitic quicklime and 1 part raw gypsum, and adding from .1 to 1 part of the product of said reaction in substantially dry form and a minor portion of retarder to 100 parts of calcined gypsum.

5. A set stabilized gypsum plaster composition, comprising 100 parts of calcined gypsum, a minor portion of retarder, and from .1 to 1 part of pre-reacted stabilizer consisting of the dry product of the reaction of a mixture consisting essentially of 2 parts of a sulfate of the group consisting of aluminum, sodium acid and potassium aluminum in 1 to 4 parts lime in the presence of water.

6. A set stabilized gypsum plaster composition, comprising 100 parts of calcined gypsum, a minor portion of retarder, and from .1 to 1 part of pre-reacted stabilizer consisting of the dry product of the reaction of a mixture consisting essentially of from 25% to 50% of the group consisting of aluminum, sodium acid, and potassium aluminum, from 25% to 50% lime and a filler of the class consisting of raw gypsum, calcined gypsum, limestone, diatomaceous earth, clay, silica flour, perlite and dead burnt gpsum in the presence of water.

7. A set stabilized gypsum plaster composition, comprising 100 parts of calcined gypsum, a minor portion of retarder, and from .1 to 1 part of pre-reacted stabilizer consisting of the dry product of the reaction of a mixture consisting essentially of from 25% to 50% alum, from 25% to 50% dolomitic quicklime and a filler of the class consisting of raw gypsum, calcined gypsum, limestone, diatomaceous earth, clay, silica flour, perlite and dead burnt gypsum in the presence of water.

8. A set stabilized gypsum plaster composition, comprising 100 parts of calcined gypsum, a minor portion of retarder, and from .1 to 1 part of pre-reacted stabilizer consisting of the dry product of the reaction of a mixture consisting essentially of about 1 part alum, 1 part dolomitic quicklime and 1 part raw gypsum in the presence of water.

References Cited in the file of this patent

UNITED STATES PATENTS

| Number | Name | Date |
|---|---|---|
| 1,951,691 | Coxon | Mar. 20, 1934 |
| 1,989,641 | King | Jan. 29, 1935 |
| 2,015,481 | Lefebure | Sept. 24, 1935 |
| 2,078,198 | King | Apr. 20, 1937 |
| 2,078,200 | King | Apr. 20, 1937 |
| 2,216,555 | King et al. | Oct. 1, 1940 |
| 2,248,033 | Wallace et al. | July 1, 1941 |
| 2,465,278 | Schenker | Mar. 22, 1949 |

U. S. DEPARTMENT OF COMMERCE

PATENT OFFICE

CERTIFICATE OF CORRECTION

Patent No. 2,820,714            January 21, 1958

Henry James Schneiter et al.

It is hereby certified that error appears in the printed specification of the above numbered patent requiring correction and that the said Letters Patent should read as corrected below.

Column 2, line 39, for "dehydrated" read --rehydrated--; column 4, line 51, for "plaster is" read --plaster in--; column 6, line 9, for "such as" read --such an--; lines 57 and 62, for "quickline", each occurrence, read --quicklime--; column 7, line 13, after "the set" insert --of--; same column 7, line 32, and column 8, line 14, for "gpsum", each occurrence, read --gypsum--.

Signed and sealed this 1st day of April 1958.

(SEAL)
Attest:

KARL H. AXLINE

Attesting Officer

ROBERT C. WATSON
Commissioner of Patents